United States Patent [19]
Tein et al.

[11] Patent Number: 5,580,510
[45] Date of Patent: Dec. 3, 1996

[54] METHOD FOR IMPROVING THE TOUGHNESS OF SILICON CARBIDE-BASED CERAMICS

[75] Inventors: Tseng-Ying Tein, Ann Arbor; Gregory E. Hilmas, Dexter, both of Mich.

[73] Assignee: The Regents Of The University of Michigan, Ann Arbor, Mich.

[21] Appl. No.: 166,675

[22] Filed: Dec. 14, 1993

Related U.S. Application Data

[63] Continuation of Ser. No. 847,901, Mar. 6, 1992, abandoned.

[51] Int. Cl.⁶ .................................................. C04B 35/575
[52] U.S. Cl. ............................................. 264/332; 501/89
[58] Field of Search ................................. 264/332; 501/89

[56] References Cited

U.S. PATENT DOCUMENTS

| | | | |
|---|---|---|---|
| 4,826,791 | 5/1989 | Mehrotra | 501/89 |
| 4,935,389 | 6/1990 | Umebayashi | 501/89 |

OTHER PUBLICATIONS

"Contribution to the Phase Diagram $Si_3N_4$–AlN–$Al_2O_3$–$SiO_2$," by L. J. Gauckler, H. L. Lukas and G. Petzow, *J.Am.Ceram.Soc.*, 58 [7]346–347 (1975).

"The Structural Characterization of SiAlON Polytypoids" by D. P. Thompson, P. Korgul and A. Hendry in Progress in Nitrogen Ceramics (Edited by F. L. Riley) NATO ASI Series, Series E: Applied Sciences –No. 65, pp. 61–74 (1983).

"Role of $Al_2O_3$ and $SiO_2$ Additions in Sintering of AlN," by K. Komeya, H. Inoue and A. Tsuge, *J.Am.Ceram.Soc.*,57 [9] 411–412 (1974).

"Sintering of Aluminum Nitride with Low Oxide Addition" by K. A. Schwetz, H. Knoch and A. Lipp, in Progress in Nitrogen Ceramics (Edited by F. L. Riley), NATO ASI Series. Series E: Applied Sciences–No. 65, pp. 245–252, 1983.

"Fabrication and Characterization of Silicon Carbide Alloys: The Silicon Carbide–Aluminum Nitride System," by Rafaniello, W., Doctoral Dissertation, The University of Utah, (1984).

"High Temperature Reactions and Microstructures in the $Al_2O_3$–AlN System," by J. W. McCauley and N. D. Corbin, NATO ASI Series. Series E: Applied Sciences–No. 65, pp. 111–118, 1983.

"Evolution of Mircostructure in Polycrystalline Silicon Carbide," by S. Shinozaki and K. R. Kinsman, Proceedings of Crystalline Ceramics; Edited by Hayne Palmer III, R. F. Davis, and T. M. Hare, p.641 (1978).

"Composition and Properties of Hot–Pressed SiC–AlN Solid Solutions," by R. Ruh and A. Zangvil, *J.Am.Ceram.Soc.*, 65 [5] 260–265 (1982).

"A Critical Evaluation of Indentation Techniques for Measuring Fracture Toughness: I. Direct Crack Measurements," G. R. Anstis Chantikul, B. R. Lawn and D. B. Marshall, *J. Am–Ceram Soc.*, 64 [9] 533–543 (1981).

"Fabrication and Characterization of SiC–AlN Alloys," by W. Rafaniello, K. Cho, and A. V. Virkar, *J. Mat'ls. Sci.*, 16 (1981) 3479–3488.

"Investigation of Phase Stability in the System SiC–AlN," by W. Rafaniello, M. R. Plichta, and A. V. Virkar, *J.Am.Ceram.Soc.*, 66 [4] 272–276 (Apr., 1983).

"Fabrication, Microstructure, and Properties of SiC–AlN Ceramic Alloys," by R. R. Lee, and W. C. Wei, *Ceram, Eng. Sci. Proc.* 11[7–8] pp. 1094–1121 (1990) (addresses in–situ reinforced SiC–AlN ceramic alloys).

(List continued on next page.)

*Primary Examiner*—James Derrington
*Attorney, Agent, or Firm*—Harness, Dickey & Pierce, P.L.C.

[57] ABSTRACT

Method of improving the toughness of SiC-based ceramics. SiC, , AlN, $Al_2O_3$ and optionally $\alpha$-$Si_3N_4$ are hot pressed to form a material which includes AlN polytypoids within its structure.

25 Claims, 1 Drawing Sheet

OTHER PUBLICATIONS

"Improvements in Mechanical Properties in SiC by the Addition of Ti C Particles," by G. C. Wei and P. F. Becher, *J.Am.Ceram.Soc.*, 67[8] 571–574) (Aug., 1984).

"Fabrication of $Si_3N_4$/SiC Composites by Transient Liquid Phase Sintering" by S. D. Nunn and T. Y. Tien, *Ceramic Technology for Advanced Heat Engines Project Semiannual Progress Report for Apr. 1990 Through Sep. 1990*, pp. 153–157.

"Fabrication of SiC–AIN Composites," by G. E. Hilmas and T. Y. Tien, *Ceramic Technology for Advanced Heat Engines Project Semiannual Progress Report for Apr. 1990 Through Sep. 1990*, pp. 158–167.

METHOD FOR IMPROVING THE TOUGHNESS OF SILICON CARBIDE-BASED CERAMICS

GOVERNMENT SUPPORT STATEMENT

This invention was made with Government support under contract number DE-ACO5-840R21400 awarded by the Department of Energy. The Government has certain rights in the invention.

This is a continuation of U.S. patent application Ser. No. 07/847,901, filed Mar. 6, 1992, now abandoned, entitled "METHOD FOR IMPROVING THE TOUGHNESS OF SILICON CARBIDE-BASED CERAMICS" by Tseng-Ying Tien, et al.

BACKGROUND OF THE INVENTION

1. Technical Field

The present invention relates to silicon carbide-based ceramic systems and more particularly to improving the toughness of silicon carbide-based ceramic systems.

2. Discussion

Ceramics are growing in popularity as a structural material for many applications, such as heat engines. One drawback encountered in the ceramic field is a difficulty in improving the toughness of the ceramic material. A popular ceramic system is based upon silicon carbide (SIC). SiC-based systems are popularly employed in many applications. A conventional β-SiC material exhibits a typical fracture toughness ($K_{IC}$) such as about 2.7±0.2 Mpa-√m. Unfortunately, this often may not be sufficient for a number of commercial applications, such as certain heat engine applications. It is, therefore, desirable to improve the toughness of SiC-based systems.

The existence of a series of aluminum nitride (AlN) rich solid solutions in the system $Si_3N_4$—$SiO_2$—AlN—$Al_2O_3$ has been reported L. J. Gauckler, H. L. Lukas and G. Petzow, Contribution to the Phase Diagram $Si_3N_4$—AlN—$Al_2O_3$—$SiO_2O_3$, *J. Am. Ceram. Soc.*, 58 [7] 346–347 (1975); see also, D. P. Thompson, P. Korgul and A. Hendry, "The Structural Characterization of SiAlON Polytypoids" in "Progress in Nitrogen Ceramics" (Edited by F. L. Riley) NATO ASI Series, Series E: Applied Sciences—No. 65, pp. 61–74 (1983). Some of the polytypoids have been recognized as having an elongated plate like morphology. An AlN-ceramic with a fibrous microstructure of 27R polytypoid has been fabricated using $SiO_2$ $Y_2O_3$ additives. See, K. Komeya, H. Inoue and A. Tsuge, "Role of $Al_2O_3$ and $SiO_2$ Additions in Sintering of AlN," *J. Am. Ceram. Soc.*, 57 [9] 411–412 (1974); and K. A. Schwetz, H. Knoch and A. Lipp, "Sintering of Aluminum Nitride with Low Oxide Addition" in "Progress in Nitrogen Ceramics" (Edited by F. L. Riley), NATO ASI Series. Series E: Applied Sciences—No. 65, pp. 245–252, 1983.

The solid solution formation of SiC-AlN has been reported. Rafaniello, W., "Fabrication and Characterization of Silicon Carbide Alloys: The Silicon Carbide-Aluminum Nitride System," Doctoral Dissertation, The University of Utah, (1984). Other related literature includes J. W. McCauley and N. D. Corbin, "High Temperature Reactions and Microstructures in the $Al_2O_3$-AlN System," NATO ASI Series. Series E: Applied Sciences—No. 65, pp. 111–118, 1983; S. Shinozaki and K. R. Kinsman, "Evolution of Microstructure in Polycrystalline Silicon Carbide," Proceedings of Crystalline Ceramics; Edited by Hayne Palmer III, R. F. Davis, and T. M. Hare, pp. 641 (1978); and R. Ruh and A. Zangvil, "Composition and Properties of Hot-Pressed SiC-AlN Solid Solutions," *J. Am. Ceram. Soc.*, 65 [5] 260–265 (1982).

SUMMARY OF THE INVENTION

The method of the present invention includes the steps of providing a predetermined amount of the following starting materials:

(a) SiC;

(b) aluminum nitride (AlN); and (c) aluminum oxide or alumina ($Al_2O_3$).

Optionally, silicon nitride (e.g., $\alpha$-$Si_3N_4$), silica ($SiO_2$), or both may additionally be employed. The selected starting materials are mixed and hot pressed. The resulting material includes AlN polytypoids within its structure.

The method of the present invention can be employed to produce improved SiC-based ceramic materials. The SiC-based ceramics are particularly attractive from a toughness standpoint, with toughness readings such as 8.5±0.6 MPa-√m possible (e.g. at least about 3 times higher than conventional SiC-based ceramics). The SiC-based ceramics likewise exhibit an attractive modulus of elasticity (e.g., as high as about 428 GPa or higher), and a Vicker hardness as high as 21 GPa or higher. Thus, attractive toughness is achieved without necessarily sacrificing hardness or elasticity. In a highly preferred embodiment, the resulting material is a SiC-AlN-based material containing one or more AlN polytypoid phases as a dispersed second phase.

The AlN polytypoids formed (e.g., 8H, 15R, 12H, 21R and 27R), are generally elongated rod-like or platelet-like grains, which tend to be stable at high temperatures. In turn, it is possible that such polytypoids advantageously will function as an in-situ reinforcement phase in a composite. Resulting articles find utility in a number of applications such as automotive engine components.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawing:

DETAILED DESCRIPTION OF THE PREFERRED EMBODIMENT

Figure 1:
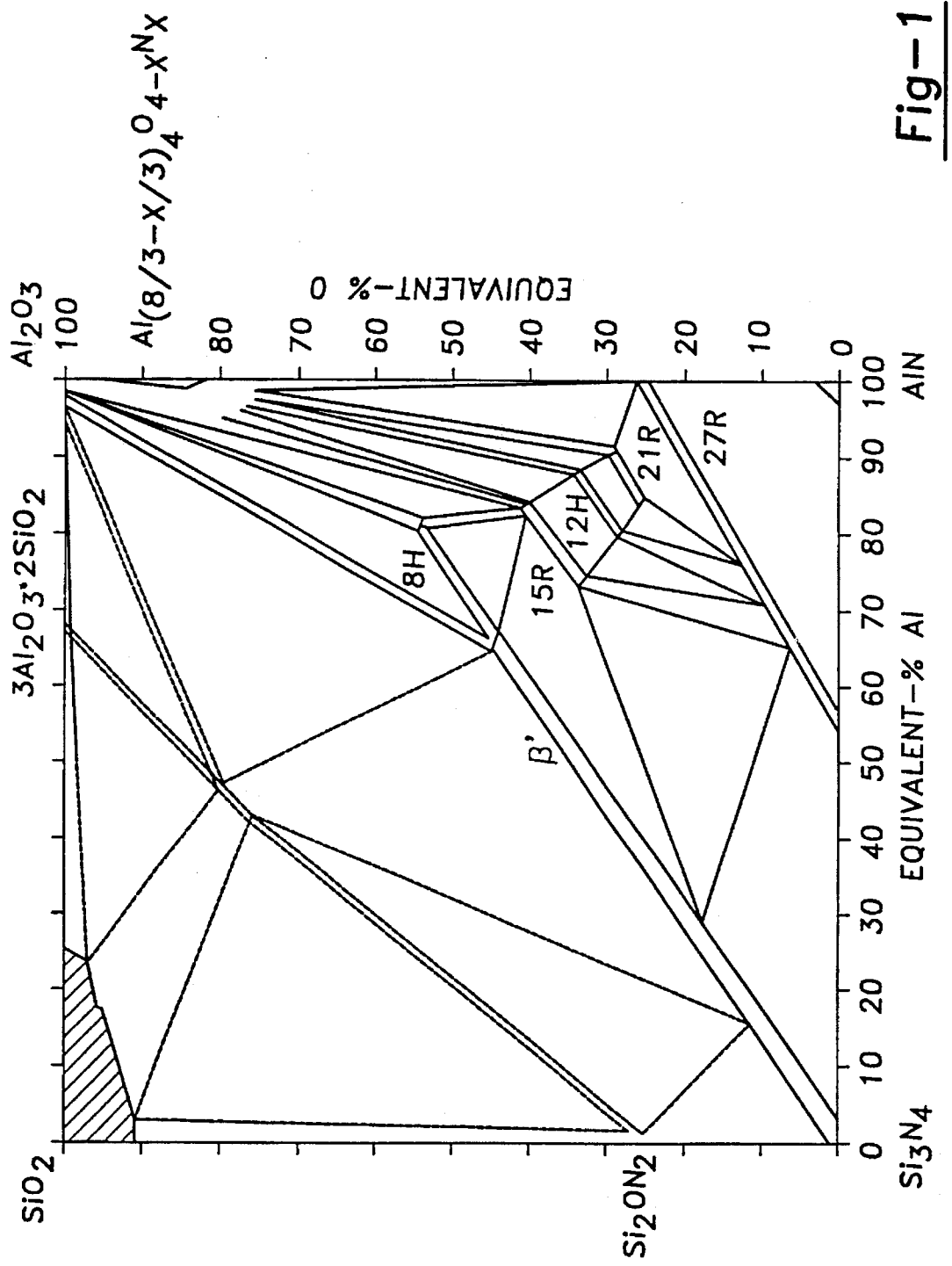
FIG. 1 is an isothermal section $Si_3N_4$—AlN—$Al_2O_3$—$SiO_2$ of the system Si—Al—O—N at 1760° C.

In a preferred embodiment, the starting materials for the present invention include:

(a) SiC;

(b) AlN; and (C) $Al_2O_3$.

Optionally a silicon nitride (e.g., $\alpha$-$Si_3N_4$) is employed. Moreover, $SiO_2$ in suitable amounts may be present. The SiC preferably is provided as a particulate or pulverulent (e.g. powder) having an average particle size ranging from about 0.05 to about 1 micron, and more preferably from about 0.1 micron to about 0.5 micron. In one embodiment, the SiC is a powder of β-SiC (3C), such as that available commercially from Hermann C. Stark. Such powder preferably has a purity of at least about 85% β-SiC. Other forms of SiC may also be present.

Alternatively, the SiC is provided as a particulate or pulverulent (e.g., powder) of α-SiC, having an average particle size ranging from about 0.05 micron to about 1 micron and more preferably from about 0.1 microns to about 0.5 micron. A suitable powder of α-SiC (6H) is available commercially from Hermann C. Starck. Preferably the α-SiC has a purity of at least about 97.5% α-SiC. During processing it is also possible that a transformation between α-SiC and β-SiC may occur (e.g., from β-SiC to α-SiC).

The SiC, whether it is α-SIC, β-SiC or both, is used in an amount ranging from about 80% to about 95% by weight of the total ingredients, and more preferably about 85% to about 95% by weight of the total ingredients. As with all starting materials herein, it will be recognized that some impurities (e.g., oxygen, such as is found in $SiO_2$) will be present, and tolerable up to certain amounts (depending primarily upon the ultimate application) as the skilled artisan will appreciate. In instances where concentrations are specified on a weight percent basis, the skilled artisan should appreciate that such amounts are readily converted to weight/weight ratios.

The aluminum nitride (AlN) is provided as a particulate or pulverulent (e.g., powder) of AlN, having an average particle size ranging from about 0.05 micron to about 3 microns and more preferably from about 0.1 micron to about 1 micron. A suitable powder of AlN is available commercially from Hermann C. Starck. The AlN, is used in an amount ranging from about 5% to 20% by weight of the total ingredients, and more preferably about 5% to 15% by weight of the total ingredients.

The alumina or aluminum oxide ($Al_2O_3$) is provided as a particulate or pulverulent (e.g., powder) of $Al_2O_3$, having an average particle size ranging from about 0.05 micron to about 1 micron and more preferably from about 0.1 micron to about 0.5 micron. A suitable powder of $Al_2O_3$ is available commercially from Alpha Chemicals. The $Al_2O_3$, is used in an amount ranging from about 0.5% to about 10% by weight of the total ingredients, and more preferably about 1% to about 10% by weight of the total ingredients.

When employed, the silicon nitride ($Si_3N_4$) is provided as a particulate or pulverulent (e.g., powder) of $Si_3N_4$, and preferably α-$Si_3N_4$, having an average particle size ranging from about 0.05 micron to about 1 micron and more preferably from about 0.1 micron to about 0.5 micron. A suitable powder of α-$Si_3N_4$ is available commercially from Hermann C. Starck. Preferably the α-$Si_3N_4$ has a purity of at least about 90%. The α-$Si_3N_4$, is used, when employed, in an amount ranging from about 0.5% to about 5% by weight of the total ingredients, and more preferably about 1% to about 3% by weight of the total ingredients.

The starting materials optionally may be of larger or smaller particle size and may include one or more additives or agents in addition to the foregoing. For instance, suitable amounts of a sintering aid may be added such as, without limitation, about 0.5 to about 1 weight percent boron, about 1 weight percent carbon, or both.

The skilled artisan should appreciate that the FIG. 1 and other data herein may be employed to aid the selection of proportions of starting materials without departing from the scope of the present invention. The aforenoted proportions, though preferable, are not intended as limiting, and may be varied by the skilled artisan according to the application.

All of the starting materials are admixed or blended together in one or more steps to form a substantially uniformly distributed powder admixture. The step or steps of admixing may employ any suitable method, including one or more of wet mixing or dry mixing methods. Any suitable mixing or blending technique may be employed. Preferably, a wet mixing method is employed. For example, the starting materials are placed in a container (e.g., a plastic bottle) with a suitable liquid medium (e.g., isopropyl alcohol). Any suitable amount of liquid medium may be employed. For example, one such suitable amount of liquid medium employed is about 200 volume percent relative to the volume of the powder admixture. A suitable milling media (e.g., porcelain or corundum milling balls having an average size of about 1 mm) is also placed in the container. The starting materials are attrition milled for a suitable time (e.g., about 3 hours). After milling, the container is opened and the liquid medium is evaporated such as by air drying or heating to a temperature of about 85° C. for a suitable time (e.g., about 12 hours), the heating being preferred. The admixture may be stored, preferably contained in a suitable container, such as a polyethylene bottle.

After drying, the admixture is densified. In one embodiment, the admixture is first isostatically cold-pressed in a suitable die. Preferably one or more pressures are applied to the admixture during cold pressing. The pressure ranges from about 100 to about 150 kg/cm$^2$. The load is maintained for any suitable time to achieve the desired density. Times as low as about one minute may be employed. The purpose of this cold-pressing step is to achieve a green density of about 60 to about 70% of theoretical density. Optionally, this cold pressing step may be deleted and the admixture may be hot pressed without it.

After cold pressing (when employed), the cold-pressed admixture is transferred to a suitable furnace, such as a graphite resistance furnace, for hot pressing. Any suitable press may be used. Preferably, a graphite die is employed in the press. More preferably the graphite die has a light coating (e.g., a coating thickness of about 1 mm) of boron nitride powder, or a like material for reducing bonding of SiC to the die during hot-pressing at elevated temperatures. Preferably throughout the hot-pressing step the furnace is maintained at one or more temperatures ranging from about 1900° C. to about 2200° C., and more preferably about 2050° C. to about 2150° C.

Preferably the graphite resistance furnace is under a substantially static and inert atmosphere (e.g., substantially static nitrogen). The admixture is placed in the graphite resistance furnace and the furnace is heated to the above-noted hot-pressing temperature range while a suitable pressure is applied to the admixture. Typically, the hot pressing step involves applying pressure during one or more heating cycles, where a heating cycle refers to the heating from a first predetermined temperature to a second predetermined temperature and than cooling to the first predetermined temperature. In a preferred embodiment one or more pressures ranging from about 200 kg/cm$^2$ to about 250 kg/cm$^2$, and more preferably about 240 kg/cm$^2$, are applied during a heating cycle at a temperature above about 1000° C., while the pressure is maintained, until cooling below about 1000° C. Preferably the pressure is maintained for about ½ to about 2 hours, and more preferably about one hour, during which the graphite resistance furnace is maintained at about 2050° C. to about 2150° C. Preferably the hot pressing conditions are selected and employed so as to achieve a density of about 95 to about 99, and more preferably at least about 98% of theoretical density.

The above combination of steps is selected to yield a resulting structure which is believed to directly increase the toughness of the novel materials of this invention by at least threefold as compared with a conventional SiC material. A microstructure containing at least one SiC matrix phase and at least one AlN polytypoid second phase is preferably formed. In other words, the parameters and compositions as set forth above are controlled, as described, to result in the enhancement of toughness by forming up to about 30%, more preferably about 5 to about 20% and still more preferably about 10% by volume of at least one specific AlN polytypoid, preferably a polytypoid selected from the group consisting of 8H, 12H, 15R, 21R, 27R and mixtures thereof (as gleaned from FIG. 1). Particularly preferred polytypoids are 12H, 21R or both. For example, without limitation, according to the process of the present invention, a fracture toughness of about 8.5 MPa-m$^2$ is possible for a resulting material having about 90 volume % SiC and about 10 volume % AlN-polytypoid (21R) or AlN polytypoid (12H) as a dispersed second phase. Preferably, the second phase is dispersed substantially uniformly throughout the structure. The resulting polytypoids generally grow as elongated "rod-like" or "platelet-like" grains thereby making them attractive candidates as in-situ reinforcements for composite systems.

It should be appreciated that the polytypoid compounds herein may be prepared independently of a SiC matrix, such as by first hot pressing its constituents, and then hot pressing with SiC. The result is typically a composite material. In a particular preferred embodiment under this approach suitable amounts of AlN, $Si_3N_4$ and $Al_2O_3$ are provided. By way of example, in a highly preferred embodiment, silicon nitride in an amount of about 5 to about 15 parks by weight, aluminum nitride in an amount of about 40 to about 60 parts by weight, and alumina in an amount of about 35 to about 45 parts by weight are provided. The relative amounts can also be selected by reference to data found in Tables 1 and 2 and in accordance with the previous disclosure, in combination with FIG. 1. These materials are admixed, like as described previously. They are then reacted, such as by heating (e.g., hot pressing, as described previously) to form reacted materials containing an AlN polytypoid selected from the group consisting of 8H, 12H, 15R, 21R, 27R and mixtures thereof and more preferably 12H, 21R or mixtures thereof. The reacted materials are then pulverized using any suitable technique to achieve a suitable particle size (e.g., about 1 to about 5 microns).

The reacted materials containing the polytypoid are then admixed with SiC using a mixing technique such as described previously. According to one embodiment, the relative amount of the SiC to the admixture is about 50 to about 80 parts by weight SiC, to about 20 to about 50 parts by weight polytypoid. In a highly preferred embodiment, about 50 parts SiC is admixed with about 50 parts polytypoid. The admixture is then densified, such as by hot pressing under the conditions described previously.

The following examples, though not intending to be limiting, illustrate the present invention.

EXAMPLES

Samples are prepared to have the final compositions of Table 1 and Table 2. The samples are prepared by hot pressing an admixture including SiC, AlN and $Al_2O_3$, in proportions sufficient to achieve the compositions as set forth in Tables 1 and 2. Hot pressing is done at a temperature of about 2000° C., a pressure of about 20 MPa and a time of about 1 hour. All samples include 0.5 weight percent boron as a sintering aid.

TABLE 1

Compositions of AlN-Polytypoids

| Polytypoid | x | c+/a– | Formula |
|---|---|---|---|
| 8H | 5 | ¾ | $SiAl_5O_5N_3$ |
| 15R | 4 ... 5 | ⅘ | $Si_{6-x}Al_{2+x}O_xN_{10-x}$ |
| 12H | 4.5 ... 6 | ⅚ | $Si_{6-x}Al_{4+x}O_xN_{12-x}$ |
| 21R | 4.5 ... 6 | 6/7 | $Si_{6-x}Al_{6+x}O_xN_{14-x}$ |
| 27R | 0 ... 6 | 8/9 | $Si_{6-x}Al_{10+x}O_xN_{18-x}$ |

TABLE 2

Compositions of β-SIC: 21R-II Polytypoid Series

| Sample | volume % β-SiC | volume % 21R-II |
|---|---|---|
| BS50:21R(II) | 50 | 50 |
| BS60:21R(II) | 60 | 40 |
| BS70:21R(II) | 70 | 30 |
| BS80:21R(II) | 80 | 20 |
| BS90:21R(II) | 90 | 10 |

A β-SiC standard is hot pressed at 2000° C. at a pressure of about 20 MPa and for a time of about 1 hour, with one weight percent boron and one weight percent carbon as sintering aids. All samples from Tables 1 and 2 and the β-SiC standard are mechanically tested.

Sections of samples are machined and ground and polished down to a 1 μm diamond paste finish in order to measure microhardness and fracture toughness. A standard Vickers diamond indenter is placed in a Wilson Tukon microhardness testing machine for all measurements. Indentation loads vary from 5 to 25 kg to fulfill the requirement that the radial/medial cracks be equal to or greater than twice the Vickers indentation diagonal. Results are calculated, as the skilled artisan would know, according to teachings such as in G. R. Anstis, P. Chantikul, B. R. Lawn and D. B. Marshall, "A Critical Evaluation of Indentation Techniques for Measuring Fracture Toughness: I. Direct Crack Measurements," J. Am-Ceram Soc., 64 [9] 533–538 (1981), incorporated by reference. The results are shown in Table 3.

TABLE 3

Mechanical Properties of β-SiC-21R(II) Polytypoid Composites

| Sample | v | E (GPa) | H (GPa) | $K_{IC}$(MPa-√m) |
|---|---|---|---|---|
| β-SiC(Standard) | 0.18 | 437 | 22.8 ± 0.7 | 2.7 ± 0.2 |
| BS90:21R(II) | 0.18 | 428 | 14.8 ± 1.0 | 8.5 ± 0.6 |
| BS80:21R(II) | 0.19 | 403 | 18.6 ± 0.5 | 5.3 ± 0.3 |
| BS70:21R(II) | 0.18 | 406 | 20.7 ± 0.6 | 2.8 ± 0.1 |
| BS60:21R(II) | 0.19 | 394 | 21.6 ± 0.6 | 2.9 ± 0.2 |
| BS50:21R(II) | 0.19 | 368 | 20.3 ± 0.8 | 2.7 ± 0.2 |

The designation (v) refers to Poisson's ratio; (E) refers to modulus of elasticity; (H) refers to hardness; and ($K_{IC}$) refers to fracture toughness.

Similar results are obtained for similar ratios of SiC to 12H polytypoid following the above procedure.

Although the invention has been described with particular reference to certain preferred embodiments thereof, variations and modifications can be effected within the spirit and scope of the following claims.

What is claimed is:

1. A process for improving a silicon carbide-based ceramic system, comprising the steps of:
   (a) admixing:
      i. silicon carbide in an amount of about 80 to about 95 parts by weight;

ii. aluminum nitride in an amount of about 5 to about 20 parts by weight;

iii. alumina in an amount of about 0.5 to about 10 parts by weight; and (b) hot pressing the resulting admixture from said admixing step (a) to form a densified material having a silicon carbide matrix phase and at least one AlN polytypoid phase selected from the group consisting of 8H, 12H, 15R, 21R, 27R polytypoid and mixtures thereof, wherein said 8H polytypoid has a composition $SiAl_5O_5N_3$;

said 15R polytypoid has a composition $Si_{6-x}Al_{2+x}O_xN_{10-x}$ with the value of x for said polytypoid ranging from about 4 to about 5;

said 12H polytypoid has a composition $Si_{6-x}Al_{4+x}O_xN_{12-x}$ with the value of x for said polytypoid ranging from about 4.5 to about 6;

said 21R polytypoid has a composition $Si_{6-x}Al_{6+x}O_xN_{14-x}$ with the value of x for said polytypoid ranging from about 4.5 to about 6; and said 27R polytypoid has a composition $Si_{6-x}Al_{10+x}O_xN_{18-x}$ with the value of x for said polytypoid ranging up to about 6.

2. A process according to claim 1 further comprising admixing silicon nitride in an amount of about 1 to about 3% by weight of the total ingredients prior to said hot pressing step (b).

3. A process according to claim 1 wherein said hot pressing step (b) is employed to form a densified material having an AlN polytypoid selected from the group consisting of 12H, 21R and mixtures thereof.

4. A process according to claim 1 wherein said hot pressing step (b) is employed to form a densified material having a 12H AlN polytypoid in an amount of about 10 volume percent in said material resulting from hot pressing.

5. A process according to claim 1 wherein said hot pressing step (b) is employed to form a densified material having a 21R AlN polytypoid in an amount of about 10 volume percent in said material resulting from hot pressing.

6. A process according to claim 1 wherein said hot pressing step (b) occurs at a temperature ranging from about 1900° C. to about 2200° C.

7. A process according to claim 1 wherein said hot pressing step (b) occurs at a temperature ranging from about 2050° C. to about 2150° C.

8. A process according to claim 6 wherein said hot pressing step (b) occurs for a time of about one half hour to about two hours.

9. A process according to claim 7 wherein said hot pressing step (b) occurs for a time of about one hour.

10. A process according to claim 9 wherein a pressure of about 200 kg/cm² to about 250 kg/cm² is employed during said hot pressing step (b).

11. A process for improving the toughness of a silicon carbide-based ceramic system, comprising the steps of:

a. preparing a first admixture comprising admixing:
   i. silicon nitride in an amount of about 5 to about 15 parts by weight;
   ii. aluminum nitride in an amount of about 40 to about 60 parts by weight; and
   iii. alumina in an amount of about 35 to about 45 parts by weight;

b. heating said first admixture to form a reaction product that includes an AlN polytypoid selected from the group consisting of 8H, 12H, 15R, 21R, 27R polytypoid and mixtures thereof;

c. pulverizing said reaction product from said heating step (b);

d. preparing a second admixture by admixing said reaction product with silicon carbide in an amount of about 50 parts by weight silicon carbide to about 50 parts by weight of said reaction product; and then e. hot pressing said second admixture to form a densified material having a silicon carbide matrix and at least one AlN polytypoid selected from the group consisting of 8H, 12H, 15R, 21R, 27R polytypoid and mixtures thereof, wherein said 8H polytypoid has a composition $SiAl_5O_5N_3$;

said 15R polytypoid has a composition $Si_{6-x}Al_{2+x}O_xN_{10-x}$ with the value of x for said polytypoid ranging from about 4 to about 5;

said 12H polytypoid has a composition $Si_{6-x}Al_{4+x}O_xN_{12-x}$ with the value of x for said polytypoid ranging from about 4.5 to about 6;

said 21R polytypoid has a composition $Si_{6-x}Al_{6+x}O_xN_{14-x}$ with the value of x for said polytypoid ranging from about 4.5 to about 6; and said 27R polytypoid has a composition $Si_{6-x}Al_{10+x}O_xN_{18-x}$ with the value of x for said polytypoid ranging up to about 6.

12. A process according to claim 11 wherein said heating step (b) occurs at a temperature in the range of about 1900° C. to about 2200° C.

13. A process according to claim 12 wherein said hot pressing step (e) occurs at a temperature in the range of about 1900° C. to about 2200° C.

14. A process according to claim 13 wherein said hot pressing step (e) occurs while under a pressure of about 200 kg/cm² to about 250 kg/cm².

15. A process according to claim 14 wherein said hot pressing step (e) occurs for a time of about one half hour to about two hours.

16. A process according to claim 15 wherein said reaction product of said heating step (b) is an AlN polytypoid selected from the group consisting of 12H, 21R and mixtures thereof.

17. A process for making a silicon carbide-based ceramic composite system, comprising the steps of:

a. preparing an admixture comprising:
   i. about 50 parts by weight of silicon carbide; and
   ii. about 50 parts by weight of an AlN polytypoid selected from the group consisting of 12H, 21R and mixtures thereof; and b. hot pressing said admixture of step (a) at a temperature in the range of about 1900° C. to about 2200° C., under a pressure of about 200 kg/cm² to about 250 kg/cm² for a time of about one half hour to about two hours to form a silicon carbide matrix and an AlN polytypoid selected from the group consisting of 12H, 21R and mixtures thereof, wherein said AlN polytypoid is dispersed in said silicon carbide matrix, wherein said 12H polytypoid has a composition $Si_{6-x}Al_{4+x}O_xN_{12-x}$ with the value of x for said polytypoid ranging from about 4.5 to about 6; and said 21R polytypoid has a composition $Si_{6-x}Al_{6+x}O_xN_{14-x}$ with the value of x for said polytypoid ranging from about 4.5 to about 6.

18. A process according to claim 17 wherein said polytypoid of said admixture is an 12H AlN polytypoid.

19. A process according to claim 17 wherein said polytypoid of said admixture is a 21R AlN polytypoid.

20. A process according to claim 17 wherein said hot pressing step occurs at a temperature in the range of about 2050° C. to about 2150° C., a pressure of about 240 kg/cm$^2$ and for a time of about one hour.

21. A process for improving a silicon carbide-based ceramic system, comprising the steps of:

(a) admixing:
  i. silicon carbide in an amount of about 80 to about 95 parts by weight;
  ii. aluminum nitride in an amount of about 5 to about 20 parts by weight;
  iii. alumina in an amount of about 0.5 to about 10 parts by weight; and (b) hot pressing the resulting admixture from said admixing step (a) to form a densified material including 21R AlN polytypoid, wherein the resulting material is capable of exhibiting a fracture toughness as high as about 8.5±0.6 MPa -√m and a modulus of elasticity as high as about 428 GPa, and wherein said 21R polytypoid has a composition $Si_{6-x}Al_{6+x}O_xN_{14-x}$ with the value of x for said polytypoid ranging from about 4.5 to about 6.

22. A process for improving a silicon carbide-based ceramic system, comprising the steps of:

(a) admixing:
  i. silicon carbide in an amount of about 80 to about 95 parts by weight;
  ii. aluminum nitride in an amount of about 5 to about 20 parts by weight;
  iii. alumina in an amount of about 0.5 to about 10 parts by weight; and (b) hot pressing the resulting admixture from said admixing step (a) to form a densified material including 15R AlN polytypoid, wherein the resulting material is capable of exhibiting a fracture toughness as high as about 8.5±0.6 MPa -√m and a modulus of elasticity as high as about 428 GPa, and wherein said 15R polytypoid has a composition $Si_{6-x}Al_{2+x}O_xN_{10-x}$ with the value of x for said polytypoid ranging from about 4 to about 5.

23. A process for improving a silicon carbide-based ceramic system, comprising the steps of:

(a) admixing:
  i. silicon carbide in an amount of about 80 to about 95 parts by weight;
  ii. aluminum nitride in an amount of about 5 to about 20 parts by weight;
  iii. alumina in an amount of about 0.5 to about 10 parts by weight; and (b) hot pressing the resulting admixture from said admixing step (a) to form a densified material including 8H AlN polytypoid, wherein said 8H polytypoid has a composition $SiAl_5O_5N_3$.

24. A process for improving a silicon carbide-based ceramic system, comprising the steps of:

(a) admixing:
  (i) silicon carbide in an amount of about 80 to about 95 parts by weight;
  ii. aluminum nitride in an amount of about 5 to about 20 parts by weight;
  iii. alumina in an amount of about 0.5 to about 10 parts by weight; and (b) hot pressing the resulting admixture from said admixing step (a) to form a densified material including 12H AlN polytypoid, wherein said 12H polytypoid has a composition $Si_{6-x}Al_{4+x}O_xN_{12-x}$ with the value of x for said polytypoid ranging from about 4.5 to about 6.

25. A process for improving a silicon carbide-based ceramic system, comprising the steps of:

(a) admixing:
  i. silicon carbide in an amount of about 80 to about 95 parts by weight;
  ii. aluminum nitride in an amount of about 5 to about 20 parts by weight;
  iii. alumina in an amount of about 0.5 to about 10 parts by weight; and (b) hot pressing the resulting admixture from said admixing step (a) to form a densified material including 27R AlN polytypoid, wherein said 27R polytypoid has a composition $Si_{6-x}Al_{10+x}O_xN_{18-x}$ with the value of x for said polytypoid ranging up to about 6.

* * * * *